(12) United States Patent
Oberli et al.

(10) Patent No.: US 10,478,759 B2
(45) Date of Patent: *Nov. 19, 2019

(54) FILTER ELEMENT

(71) Applicant: RT-FILTERTECHNIK GMBH, Friedrichshafen (DE)

(72) Inventors: Frank Oberli, Eglisau (CH); Dirk Schoenfeld, Schwabsdorf (DE)

(73) Assignee: RT-FILTERTECHNIK GMBH, Friedrichshafen (DE)

(*) Notice: Subject to any disclaimer, the term of this patent is extended or adjusted under 35 U.S.C. 154(b) by 0 days.

This patent is subject to a terminal disclaimer.

(21) Appl. No.: 16/245,403

(22) Filed: Jan. 11, 2019

(65) Prior Publication Data

US 2019/0143250 A1 May 16, 2019

Related U.S. Application Data

(63) Continuation of application No. 14/440,665, filed as application No. PCT/EP2012/005376 on Dec. 24, 2012, now Pat. No. 10,213,709.

(30) Foreign Application Priority Data

Nov. 14, 2012 (DE) .......................... 10 2012 022 283
Nov. 14, 2012 (DE) .......................... 10 2012 022 285

(51) Int. Cl.
*B01D 29/21* (2006.01)
*B01D 29/33* (2006.01)
*B01D 29/56* (2006.01)

(52) U.S. Cl.
CPC ............ *B01D 29/21* (2013.01); *B01D 29/333* (2013.01); *B01D 29/56* (2013.01); *B01D 2201/122* (2013.01)

(58) Field of Classification Search
CPC ...... B01D 29/21; B01D 29/56; B01D 29/333; B01D 2201/122
See application file for complete search history.

(56) References Cited

U.S. PATENT DOCUMENTS 2,627,350 A 2/1953 Wicks
3,799,354 A 3/1974 Buckman et al.
(Continued)

FOREIGN PATENT DOCUMENTS

DE 10 2010 025 215 12/2011
EP 504 038 9/1992
(Continued)

OTHER PUBLICATIONS

International Search Report (Isr) issued Aug. 5, 2013 in International (PCT) Application No. PCT/EP2012/005376.

*Primary Examiner* — Krishnan S Menon
*Assistant Examiner* — Waqaas Ali
(74) *Attorney, Agent, or Firm* — Wenderoth, Lind & Ponack, L.L.P.

(57) ABSTRACT

A filter element has a preferably multilayer structure of a pleated filter medium (3) with a plurality of individual filter pleats (5, 7). Due to an alternating sequence of filter pleats (5) with a first pleat height (h1) and filter pleats (7) with a second pleat height (h2), more effective filter surfaces are available than with filter pleats with a uniform pleat height. Upon throughflow by a fluid to be filtered, a lower surface load for the filter medium (30 and lower passage speed of the fluid are present during filtration. A static loading of the filter medium (3) during operation of the filter is then reduced. A hydraulic circuit has such a filter element (1).

10 Claims, 2 Drawing Sheets

(56) References Cited

U.S. PATENT DOCUMENTS

| | | |
|---|---|---|
| 7,128,835 B1 | 10/2006 | Hundley et al. |
| 2007/0007218 A1 | 1/2007 | Hundley et al. |
| 2007/0278149 A1 | 12/2007 | Kuwabara |
| 2008/0308483 A1 | 12/2008 | Hundley et al. |
| 2009/0014378 A1 | 1/2009 | Hundley et al. |
| 2010/0243554 A1 * | 9/2010 | Herrin .................... B01D 29/21 |
| | | 210/457 |

FOREIGN PATENT DOCUMENTS

| | | | |
|---|---|---|---|
| EP | 1 757 355 | 2/2007 | |
| FR | 2 791 579 | 10/2000 | |
| FR | 2791579 A1 * | 10/2000 | ........... B01D 29/111 |
| JP | 2007-050313 | 3/2007 | |
| WO | 87/01301 | 3/1987 | |
| WO | 97/03744 | 2/1997 | |
| WO | WO-9703744 A1 * | 2/1997 | ............. B01D 29/21 |
| WO | 00/40319 | 7/2000 | |
| WO | 01/37969 | 5/2001 | |
| WO | 2004/041407 | 5/2004 | |
| WO | 2010/111411 | 3/2010 | |

* cited by examiner

FILTER ELEMENT

REFERENCE TO RELATED APPLICATION

This application is a continuation of U.S. patent application Ser. No. 14/440,665, filed May 5, 2015 and entitled "Filter Element and Hydraulic Circuit with Such Filter Element," the entire subject matter of which is hereby incorporated by reference.

FIELD OF THE INVENTION

The invention relates to a filter element with a pleated filter medium having a preferably multilayer structure, including a plurality of individual filter pleats. In addition, the invention relates to a hydraulic circuit of such a filter element.

BACKGROUND OF THE INVENTION

Filter elements of this kind are available commercially. Such filter elements are widely used in conjunction with a variety of fluid systems for filtering process fluids, pressure fluids such as hydraulic oil, as well as liquid fuels and lubricants for preparing fluid media and the like.

In many cases, only a limited amount of usable space is available in fluid systems, in which the filter elements are used, for installing or removing system parts that contain the relevant filter cartridge-type filters. On the other hand, a filtering surface of sufficient size provided by the filter element is required to filter correspondingly large fluid flows.

To provide a sufficiently large filtering surface, the known filter elements available on the market have a typically zig-zag-shaped folded or pleated filter medium composed of multiple layers of various filter materials. During manufacture, the filter medium is fed through a cutting device, in which the edge of the filter medium is cut to size before it is conveyed further to a folding machine, in which the zig-zag shape or the pleating, having a plurality of individual filter folds, is formed. During the further course of manufacture, the customized filter medium is separated into sections, which are shaped to form a tubular body, thereby forming the filter element.

In the standard filter element solution described above, all the filter folds routinely have the same insertion height. Depending on the flow-through conditions, the multiple filter folds disposed adjacent to one another may be displaced toward one another due to their flexibility or resilience, and thus come into direct contact with one another along their effective filtering surface. This displacement results in a type of "blocking" of the element material in this contiguous region, since the medium to be filtered is then no longer able to reach uninterruptedly all the filter folds of the element structure. The result is that the remaining filter folds spread apart from one another, are not blocked, and are increasingly perfused by the fluid to be cleaned of the particle contaminants. As a consequence, the flow velocity rises, and the surface load on these folds of the filter medium is increased. Since the multilayer filter medium is routinely formed from individual nonwoven filter medium of individual fibers, this load increase results in an increased discharge of fiber material from the fleece-composite material (migration), which, in turn, reduces the service life of the filter element.

One great challenge the filtration technology must now face is the fact that, due to environmental regulations, the hydraulic fluids to be cleaned using primarily such filter elements may no longer include any metal additives, in particular, any environmentally harmful zinc additives. As a result, the electrical conductivity of the hydraulic fluid is reduced. Due to this reduced conductivity, electrostatic charges, as they routinely occur during flow-through of the medium, can no longer be effectively dissipated via the hydraulic fluid, as in the past. As a result of this inability, discharge processes may occur in the filter element and may occur in the form of discharge flashes. Those flashes routinely destroy the sensitive filter medium in the same way that they promote the oil aging of the hydraulic fluid(s). Particularly in the case of in-tank applications of the filter element, in which the filter element is used in closed tank units, such discharge flashes may increase the danger of explosion.

To counter these effects, the prior art (DE 10 2004 005 202 A1) has proposed providing, in conjunction with a filter element having a filter medium, which extends between two end caps. Each end cap is connected to an assignable end region of the filter medium and is supported on at least one side by a support tube. At least one of the end caps and/or at least one end region of the filter medium includes a contacting device and/or each end cap itself or parts thereof are designed to be conductive, to thereby ensure a dissipation of the electrostatic charges routinely occurring during operation of the filter element. The charge generated on the filter medium as a result of the above described tribological effects may thus drain off at a ground point or ground site via the contact device and/or via each end cap. The "controlled dissipation" in this regard has proven to be very effective. However, maintaining the upstream contact device requires increased material and manufacturing expenditure, which, accordingly, reflects negatively in terms of the manufacturing costs of the element.

An alternative approach has been described in WO 2009/089891 A1, which shows a filter element solution without the use of a contact device. In this known solution, a manufacturing material is selected for the filter medium, the potential difference of which to the fluid to be cleaned is minimal, depending on the respective selected cleaning task. In particular, filter solutions in this case are addressed, in which parts of the filter medium exhibit such different potentials relative to one another and/or to the fluid to be cleaned (hydraulic fluid), that, at least in part, they cancel each other out during the filtration operation, or in which a targeted discharge back into the hydraulic fluid is sought, or in which a return of electrical charge to the entire filter medium is provided using a charge equalization layer in the filter media system. Thus, with this known solution, estimating the potential produced between two interacting components, i.e., between oil and filter medium, in a normal application, is possible in accordance with a known electrical voltage series for various filter materials provided for the filter medium (filter fleece). In this known, very advantageous solution, very little charge is generated, in principle, so that the problem of having to discharge the former at a ground point as shown in the above description, via a discrete contact device, does not even arise. Nevertheless, here too, when selecting the filter insert materials in question, based on the aforementioned tribological voltage series, a correspondingly high expense must be incurred, both from the standpoint of pre-development as well as from the standpoint of material supply, to obtain positive results, which again increases the manufacturing costs of the filter element.

In addition, all of the known solutions described above have in common the fact that the disadvantageous "blocking" effect may occur as a result of displacement of free filter fold ends due to the flow-through of the fluid.

SUMMARY OF THE INVENTION

Against this background, an object of the invention is to provide an improved filter element and a hydraulic circuit having such a filter element, in which, given a cost-effective and functionally reliable design, the danger of undesired electrostatic discharge is minimized.

This object is basically achieved by a filter element and a hydraulic circuit having such filter element where the filter element has a greater effective filtering surface available due to an alternating sequence of filter pleats having a first pleat height and of filter pleats having a second pleat height, than is the case with known solutions with filter pleats having a uniform pleat height. To a person of average skill in the field of filtration technology, surprisingly such configuration of filter pleats and a corresponding flow-through of a fluid to be filtered results in an overall lower surface load to the filter medium, and in a lower velocity at which the fluid passes during filtration, which, in turn, assists in significantly reducing the static charge of the filter medium during operation of the filter.

A stabilization takes place as a result of the aforementioned configuration of filter pleats, wherein the filter pleats of the second pleat height reinforce the filter pleats of the first pleat height. Thus, a pressure-resistant and functionally reliable structure for the filter medium is achieved via the filter pleats of the differing height characteristic. In addition, the filter pleats of the first pleat height are maintained in their original configuration during operation of the filter element and, in this way, have a particularly large effective filtering surface facing the dirt side or the clean side. The open surface facing the dirty side or the clean side is therefore larger than in the case of conventional filter elements having a uniform pleat height over the entire circumference, which are routinely prone to the aforementioned "blocking". Hence, this structure allows the fluid in the solution according to the invention to more easily penetrate the filter medium, which results in a filter element having improved filter efficiency over the life of the filter, and having a longer service life.

Efforts are frequently made in filtration technology to optimize the filter element with its filter medium such that a high flow-through efficiency, in addition to a high cleaning efficiency, is achieved by using as many individual filter pleats of the same insertion height as possible in the element. Here, a different approach is taken by simply dispensing with a plurality of individual pleats of the same height and, therefore, with theoretically available filtering surface. By reducing the height of the filter pleats having the second pleat height, the lateral boundary surfaces of the adjoining filter pleats of the first filter height are kept free for a flow-through. In this way, those surfaces increase the effective filtering surface and, therefore, the flow-through efficiency and the separating efficiency of the filter medium. A lower flow-through velocity for the fluid has been shown to be achieved as a result of the associated, on the whole lower, surface load to the filter medium with a comparable flow-through efficiency, as compared to known solutions. The result is that electrostatic charges do not even occur or occur at least only to a reduced extent, so that the charges need not be overcome via additional structural measures, such as a contact device or a selective choice of filter materials having different potentials.

In spite of these advantageous properties, the solution according to the invention can be appropriated combined with an additional conductive contact device and/or with the antistatic design of the filter medium described above, which will be described in greater detail below.

Preferably, the filter pleats having the second pleat height are at least half as high as the filter pleats having the first pleat height. In this context, tests were able to show that an optimum exists if the second pleat height is 85% to 95%, preferably 90%, of the first pleat height. For this range of the pleat height, an optimal density of the filter medium in conjunction with a maximum free surface of the filter medium is at the lowest electrostatic charge possible.

Alternatively, the filter pleats having the second pleat height may be half as high as the pleats having the first pleat height.

Particularly preferred, the transitions of the filter pleats have a uniform size, preferably having uniform curvature radii. Due to the standardized curvature radii, the filter material is protected during the forming of the pleats. Breaks do not form in the filter material, which would adversely affect the filtration efficiency of the filter element. Also avoided as a result are sharp-edged transitions and tips, at which electrical voltage spikes could form, with the negative result that electrical voltage is released into the fluid, in particular in the form of hydraulic fluid(s).

In addition, straight or planar sections of the filter pleats may each be spaced apart from one another. This spacing ensures that the fluid present on the dirt side is present over the entire surface of the filter medium at an approximately uniform pressure. Thus, the entire surface of the filter medium bears approximately the same surface load. In particular, this structure avoids turbulences during the flow-through of the filter medium, which otherwise promote the electrostatic charge.

In one particularly advantageous embodiment, the pleated filter medium has a tubular design, and the straight or planar sections of the filter pleats each extend in a plane, in which a central longitudinal axis of the filter element is also situated. This configuration yields a particularly high packing density of the filter medium with a plurality of filter pleats of varying pleat heights.

The filter medium may include multiple layers of filter fleece or other layers of filtering media. The layers preferably have different electron release properties and/or electron receiving properties. A filter layer preferably releases electrons to the same extent that they are received by the other filter layer. Upon flow-through of the filter medium, the properties present are then essentially electrically neutral.

As viewed in an axial top view of the filter medium and from the dirt side or the clean side, the filter pleat having the second pleat height, which is delimited in each case by an adjacently disposed filter pleat having the first pleat height, has a ω-type pleat configuration.

Due to the ω-type pleat configuration, an open holding space for fluid is formed on the clean side or on the dirt side in the manner of a phantom cylindrical segment between two adjacently disposed filter pleats having the first pleat height. Those two pleats of the first pleat height delimit a filter pleat having the second pleat height. The holding space results in an equalization, and preferably a reduction, of the flow velocity of the fluid through the filter element during operation of the filter element.

Also due to the ω-type pleat configuration, which under normal conditions is perfused with a fluid contaminated with particles resulting in an electrostatic charging of the filter element, this charging is reduced during operation of the filter element as a result of the reduction of the fluid flow velocity caused by the respective holding space.

The hydraulic circuit according to the invention includes a filter element of the aforementioned kind and a ground for the circulating fluid. The filter element as described above is designed such that it generates less charge in the fluid than is degradable by grounding the hydraulic circuit with the use of its components.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
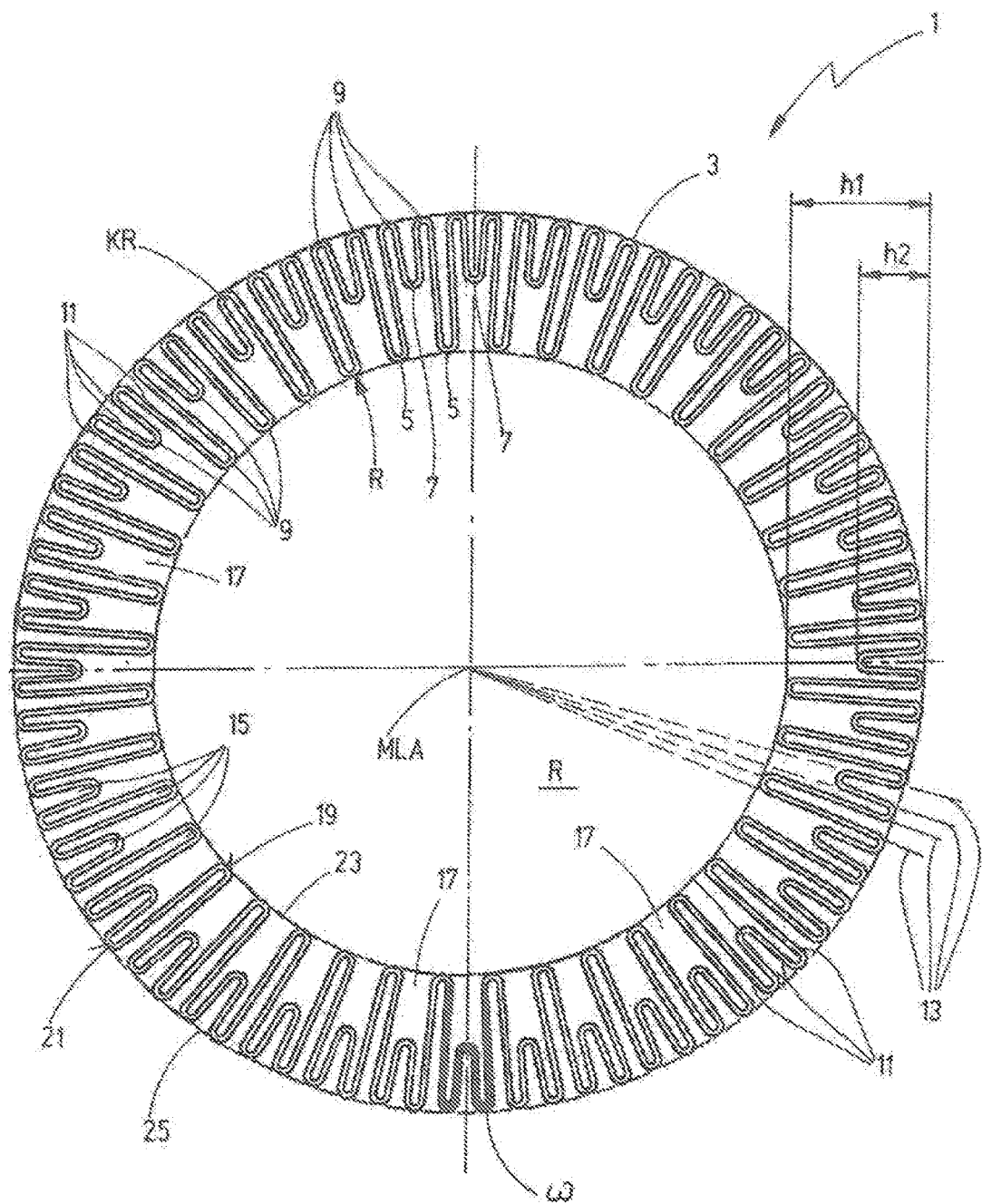
FIG. 1 is a front-end top view of the filter element according to an exemplary embodiment of the invention.
Figure 2:
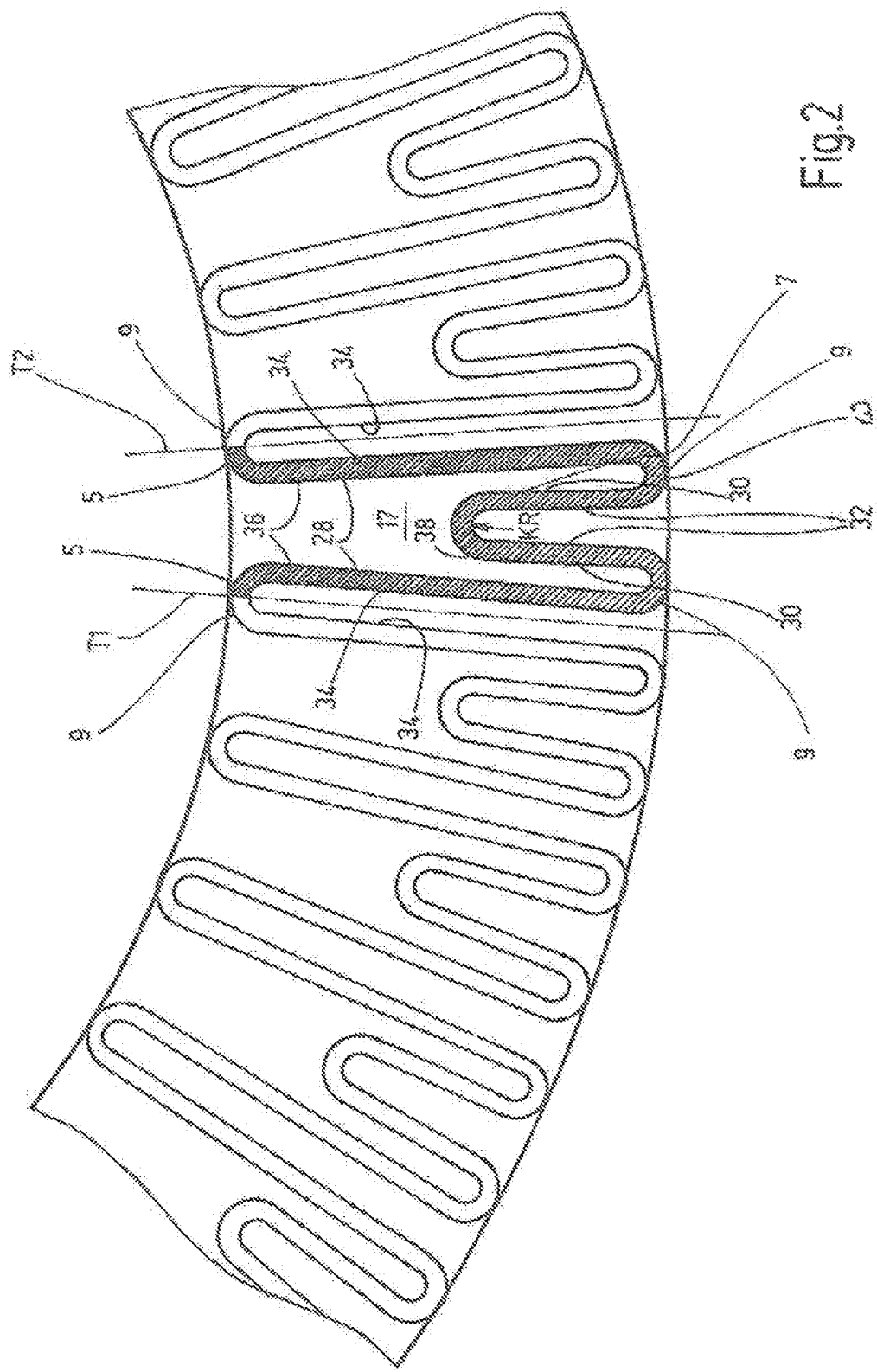
FIG. 2 is an enlarged, pa op view of a lower segment portion of the filter element according to FIG. 1.

For the sake of simplicity, the filter element is depicted wholly or in part in FIGS. 1 and 2, in each case only in a front-end top view. The filter element as such routinely has a cylindrical shape, as is shown, for example, in the previously cited prior art documents DE 10 2004 005 202 A1 and WO 2009/089891 A1. In this respect, in terms of the overall configuration of the filter element, reference is made to the relevant documents.

FIG. 1 also shows a filter element 1 including a filter medium 3 having a multilayer structure. The filter medium 3 includes first and second filter pleats 5, 7 of varying first and second pleat heights h1, h2, respectively. The filter pleats have a sequence of first filter pleats 5 having a first pleat height h1 alternating with second filter pleats 7 having a second pleat height h2. In this way, more effective filtering surface is available than in the case of filter elements, in which the filter pleats have a uniform pleat height. Upon flow-through of a fluid to be filtered, the result is a lower surface load to the filter medium 3 and a lower flow-through velocity of the fluid during filtration. Thus, the static charging of the filter medium 3 and of the filtered fluid is reduced during filter operation.

As can be seen in FIG. 1, the filter pleats 5 having the first pleat height h1 are approximately twice as high as the filter pleats 7 having the second pleat height h2. In addition, the filter pleats 5, 7 are provided with transitions 9, which have curvature radii KR of a uniform size. As a consequence of this, the straight or planar sections 11 of the filter pleats 5, 7 are each spaced apart from one another. The pleated filter medium 3 has a tubular design. The straight sections 11 of the filter pleats 5, 7 each extend in a plane 13, in which a central longitudinal axis MLA of the filter element is also located. In this way, the planar sections 13 of the filter pleats 5, 7 are spaced uniformly apart from one another. Thus, an adhesion or bonding of the filter pleats 5, 7 cannot occur, which would adversely affect the filtering efficiency.

The filter medium 3 has multiple filter layers, made, in particular, of filter fleece. These may differ in terms of their electron release properties or electron receiving properties. In this way, for example, for electrical charges can be accumulated by fluid in one layer of the filter medium 3 to then be released in another layer.

As viewed in the axial top view of the filter medium 3 and from the clean side R, the filter pleat 7 having the second pleat height h2, which is delimited in each case by an adjacent filter pleat 5 having the first pleat height, forms a ω-type pleat configuration. The individual filter pleats 5, 7 of varying pleat heights h1, h2 are spaced apart from one another to form the ω-type pleat configuration. In this way, fine filtration regions are formed on the bottom 15 of the filter medium 3 disposed on the clean side.

Due to the ω-type pleat configuration, an open holding space 17 for fluid is formed on the clean side R in the manner of a virtual cylindrical segment between two adjacently disposed filter pleats 5 having the first pleat height h1, which delimit a filter pleat 7 having the second pleat height h2, the holding space resulting, during operation of the filter element 1, in an equalization and, preferably in a reduction, of the flow velocity of the fluid through the filter element 1.

Finally, due to the ω-type pleat configuration, which under normal conditions is perfused with a fluid contaminated with particles from the inner side 19 to the outer side 21, resulting in an electrostatic charging of the filter element 1, this charging is reduced during operation of the filter element as a result of the reduction of the fluid flow velocity caused by the respective holding space 17.

In FIG. 1, the filter element 1 is delimited toward the inner side 19 as well as to the outer side 21 by phantom circles 23, 25. However, the inner contour 23 and/or the outer contour 25 of the filter element 1 may have shapes other than circular, in particular, triangular, rectangular, polygonal or ellipsoidal cross-sections. In addition, equally thick or Reuleaux triangles (not depicted) are possible as inner and/or outer cross-sectional shapes. Since the filter element 1, as viewed in the direction in FIG. 1, is perfused from the inside to the outside, a corresponding support tube known in the prior art, and therefore not further depicted, having a perforation as a fluid passage, may be present on the outside 25 of the filter element.

FIG. 2 shows an enlarged image detail of a lower cylindrical segment according to FIG. 1 with a single ω-pleat depicted in a darkened color. As illustrated in FIG. 2, the ω-pleat in this case is delimited from the adjacent adjoining ω-pleats by two virtual parting lines T1 and T2. The overall structure of the ω-pleat is uniform. The inner side walls 28 of the filter pleats 5 facing one another and the outer side walls 30 of the middle filter pleat 7, which adjoin in pairs the respectively associated side walls 28, define, relative to one another, a filter pleat spacing that corresponds essentially to the pleat spacing which is bounded by the inner side walls 32 of the filter pleat 7 in the center of the ω-pleat configuration. The pleat spacing between the inner side walls 34 of each filter pleat 5 is similarly bounded. Thus, the aforementioned pleat spacings in alternating sequence between the filter pleats 5 and the center filter pleats 7 of each and every ω-pleat structure are identical, and all side walls 28, 30, 32 extend virtually parallel to one another.

In terms of charging technology, the adjacent side walls 36 and 38 of the filter pleats 5, 7 facing one another form a type of plate capacitor, which are accordingly able to absorb the charges in the free fluid medium flow. Due to the regular configuration of the individual, ω-shapes adjacent one another in the pleat structure, an equalization of the electrical potential occurring over the entire surface of the filter material is achieved, so that charge jumps are avoided. Thus, even in the case of electrostatic charging, dangerous discharge flashes cannot occur.

To equalize the charge transport within the filter medium, the filter pleat transitions 9 are also equalized. In particular, they form continuous return bends. In contrast to the acute-angled pleat transition as shown in the prior art, the transitions of this invention form no points having voltage spikes. The charge could be abruptly passed to the hydraulic fluid via the sharp-edged pleating.

The uniformly molded arc contours in the filter material implement a type of spring characteristic, which creates a restoring force, in particular in the case of pressure spikes in the fluid to be filtered, thus preventing the pressure spikes from exerting a harmful effect on the medium.

As shown in the representation according to FIG. 2, a fine filtration space is also created by the pleat spacings in the lower region of the ω-pleat. Together with the center pleat 7, the fine filtration space reinforces the respective ω-element in the pleat structure upon receipt of the particle contaminants.

In this exemplary embodiment, the clean side R is provided on the inner side 19, and the dirty side S is provided on the outer side 21 of the filter medium 3. The clean side R could also be provided on the outer side 21, and the dirt side S could be provided on the inner side 19 of the filter medium 3.

Electrostatic charges in a hydraulic fluid, when flowing through the filter element 1, are largely avoided by the filter element 1 according to the invention. The danger of undesired electrostatic discharges is then averted. Thus, the filter element 1 may also be used in conjunction with hydraulic fluids having low electrical conductivity.

While one embodiment has been chosen to illustrate the invention, it will be understood by those skilled in the art that various changes and modifications can be made therein without departing from the scope of the invention as defined in the claims.

What is claimed is:

1. A filter element, comprising:
   a tubular and pleated filter medium having a central longitudinal axis;
   first filter pleats having a first pleat height;
   second filter pleats having a second pleat height less than said first pleat height, said first and second filter pleats being arranged in an alternating sequence providing a greater effective filtering surface than if said pleated filter medium had filter pleats having a uniform pleat height of said first pleat height, providing a corresponding flow-through of a fluid to be filtered resulting in an overall lower surface load to said filter medium and providing a lower flow-through velocity of fluid during filtration, thereby resulting in a reduced static charge of said filter medium during filter element operation; and
   planar sections of said filter pleats each extending in a plane containing an entire length of said central longitudinal axis.

2. A filter element according to claim 1 wherein said second pleat height is 90 percent of said first pleat height.

3. A filter element according to claim 1 wherein said second pleat height is 70 percent of said first pleat height.

4. A filter element according to claim 1 wherein said filter pleats have transitions with curvature radii of a uniform size.

5. A filter element according to claim 1 wherein said planar sections of each of said first and second filter pleats are spaced apart from one another.

6. A filter element according to claim 1 wherein said filter medium comprises multiple layers of filter material having at least one of varying electron releasing properties or varying electron receiving properties.

7. A filter element according to claim 1 wherein each said second filter pleat is delimited on each side thereof by an adjacent one of said first filter pleats defining a w-shaped pleat configuration as viewed from an axial top and one of an inner side or an outer side of said filter medium.

8. A filter element according to claim 7 wherein open holding spaces are formed on at least one of said inner or outer side of said filter medium of a virtual cylindrical segment between two adjacent ones of said first filter pleats, said holding spaces equalizing and reducing flow velocity of fluid through said filter medium during filtering operation.

9. A filter element according to claim 1 wherein said planar sections are spaced uniformly apart from one another.

10. A filter element according to claim 1 wherein said planar sections of each of said first and second pleats each extend in a plane containing an entire length of said central longitudinal axis.

* * * * *